United States Patent
Ormesher et al.

[11] 3,798,016
[45] Mar. 19, 1974

[54] MANUFACTURE OF FLAT GLASS

[76] Inventors: Edward Russell Ormesher, 48 Heyes Ave., Rainford, Lancashire; John Allan Yates, 21 White Rails Dr., Ormskirk, Lancashire, both of England

[22] Filed: Sept. 14, 1971

[21] Appl. No.: 180,506

Related U.S. Application Data

[63] Continuation-in-part of Ser. No. 810,151, March 25, 1969, abandoned.

[52] U.S. Cl. ............................. 65/99 A, 65/99 A
[51] Int. Cl. .................. C03b 18/02, C03c 21/00
[58] Field of Search................. 65/99 A, 30, 60

[56] References Cited
UNITED STATES PATENTS

| | | | |
|---|---|---|---|
| 3,630,702 | 12/1971 | Lawrenson | 65/99 A |
| 3,647,407 | 3/1972 | Robinson | 65/99 A |
| 3,615,334 | 10/1971 | Lawrenson et al. | 65/99 A |
| 3,656,927 | 4/1972 | Lawrenson et al. | 65/99 A |
| 3,467,508 | 9/1969 | Lowkes et al. | 65/99 A |
| 3,607,177 | 9/1971 | Robinson et al. | 65/99 A |
| 2,904,432 | 9/1959 | Ross et al. | 65/30 |
| 3,650,720 | 3/1972 | Grego et al. | 65/30 |
| 3,468,745 | 9/1969 | Navez et al. | 65/30 |
| 3,284,181 | 11/1966 | Harrell et al. | 65/99 A |

FOREIGN PATENTS OR APPLICATIONS
140,966  10/1960  U.S.S.R. .................. 65/30

*Primary Examiner*—S. Leon Bashore
*Assistant Examiner*—Kenneth M. Schor

[57] ABSTRACT

Float glass having a predetermined characteristic is manufactured by maintaining a body of surface modifying molten material against the hot glass surface, and later cleansing the treated glass surface by wiping that surface with an ancillary body of molten material. The ancillary body of molten material is spaced downstream of the first body by a distance which locates the ancillary body beyond the region of condensation of vapor originating from the first body.

4 Claims, 2 Drawing Figures

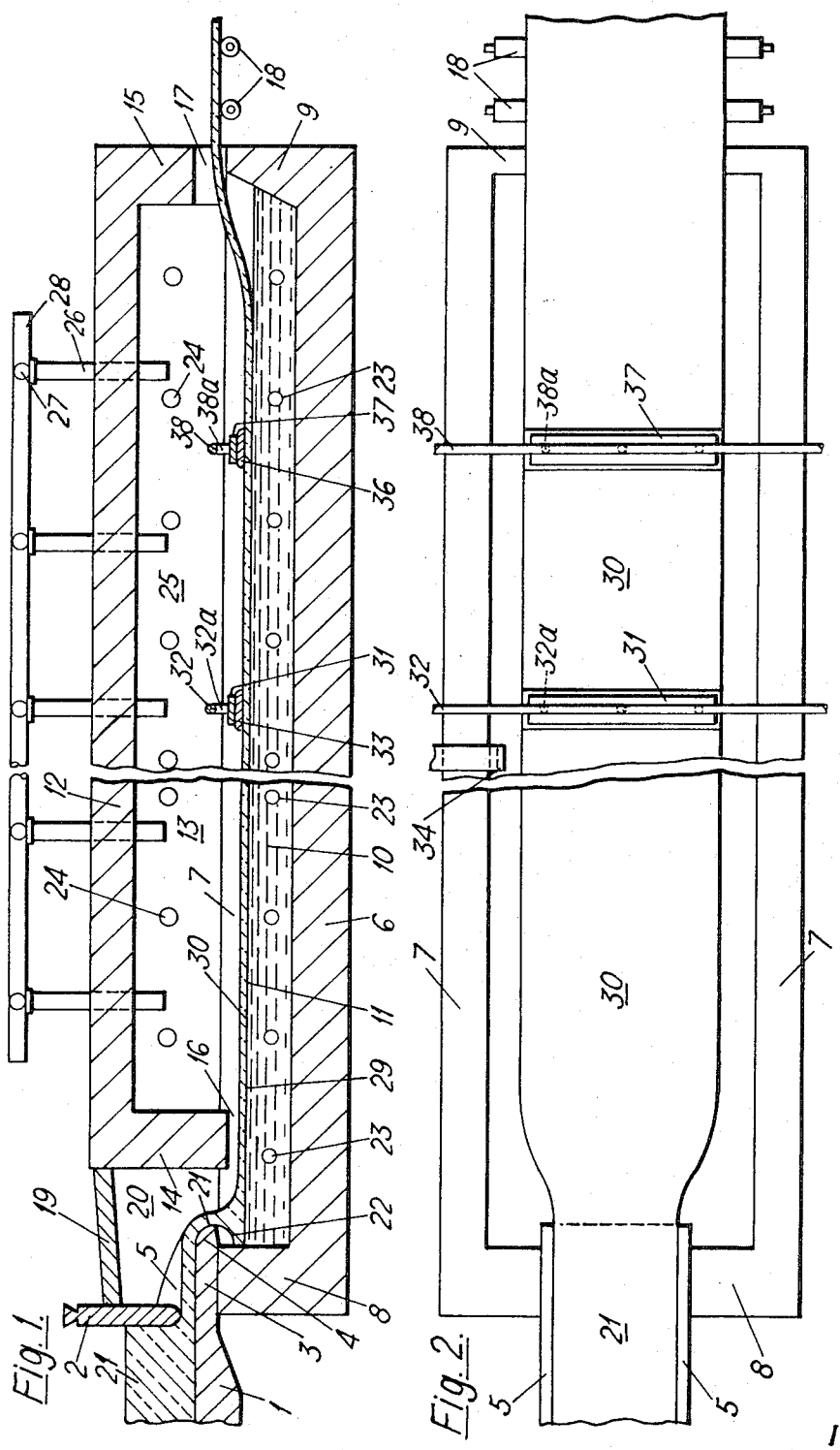

MANUFACTURE OF FLAT GLASS

RELATED APPLICATION

This application is a continuation in part of applicants copending U.S. Pat. application Ser. No. 810,151 filed Mar. 25, 1969 now abandoned.

BACKGROUND OF THE INVENTION

This invention relates to the manufacture of glass bodies having predetermined characteristics, for example, particular characteristics of reflectivity, colour or electrical conductivity.

In one known method of modifying the characteristics of a glass body, a body of molten material is maintained in contact with a surface of the glass as the glass is advanced and migration of an element from that body into the glass surface causes the desired modification of the characteristics of the glass.

Some material from the molten body may be present on the glass surface due to vapourisation from the body of molten material resulting in condensation on the treated glass surface, and because molten material from the body may remain on the glass surface, and it is a main object of the present invention to eliminate the presence of any such material on the treated surface.

According to the invention, a method of imparting a predetermined characteristic to a surface of a glass body, comprises supporting the glass body along a bath of molten material while maintaining the glass sufficiently hot to be capable of surface modification, maintaining a body of molten metal material against the hot glass surface to be treated under electrically controlled conditions causing modification of the glass surface by the molten material, effecting relative movement between the glass body and the body of molten material, and making wiping contact between the treated glass surface and an electric current-free ancillary body of molten metal material.

In the period elapsing between the initial treatment of the glass surface to modify the constitution of that surface in order to impart the desired surface characteristic, and the wiping of the surface by the ancillary body, vapours from the first body of molten material, which were generated by reason of passing a controlled electric current through the glass between the first body of molten material and the bath at the temperature for effecting surface modification, may have condensed on the ribbon surface. These condensed vapours are carried along by the ribbon of glass but are wiped from the glass surface by the ancillary body.

Further according to the invention the method of imparting to a surface of a glass body a predetermined surface characteristic comprises supporting and advancing the glass body to be treated while maintaining the glass body sufficiently hot to be capable of surface modification, maintaining the first molten metal body against the advancing hot glass surface to be treated under conditions causing modification of the glass surface by the molten metal, further advancing the glass body, and making wiping contact with the treated glass surface by the ancillary molten metal body in order to cleanse the treated glass surface. As will be appreciated the ancillary body is spaced downstream of the first molten metal body by a distance which locates the ancillary body beyond the region of condensation of vapour originating from the first body.

The invention is especially applicable to the treatment of flat glass, and from this aspect includes the method of producing flat glass having a predetermined surface characteristic, comprising supporting and advancing the flat glass at a temperature at which the glass is capable of surface modification, maintaining the first molten metal body against a surface of the flat glass under conditions causing modification of the surface by the molten metal, further advancing the treated flat glass, and wiping the advancing treated surface with the ancillary molten metal body, which is not electrically energised, in order to cleanse the treated glass surface. Since the ancillary body is downstream of the first molten metal body, it is maintained, along with the glass in its location, at a lower temperature than the first molten metal body. The temperature of that first body is in the range of about 700° to 800° C, and more specifically of about 750° to 780° C, while the temperature of the ancillary body and the glass in that region are in the range of about 650° to 700° C.

The flat glass treated by the method of the invention may be in sheet or ribbon form.

The ancillary molten body need not be the same as the first body although preferably when employed to wipe condensate from the treated glass surface, it is the same material.

Further according to the invention the method of producing float glass having a predetermined surface characteristic comprises continuously forming and advancing a ribbon of glass along a bath of molten metal, maintaining the advancing ribbon sufficiently hot to be capable of surface modification, maintaining the first molten metal body against the upper surface of the ribbon under conditions causing modification of that surface by the molten metal, continuing the advance of the ribbon along the bath, and wiping the upper surface of the ribbon with the ancillary molten metal body in order to take up any material from said body which is present on the treated ribbon surface.

The advancing ribbon may be maintained sufficiently hot to be electrically conductive, the molten metal body is segregated against the upper surface of the ribbon and a controlled electric current is passed through the glass between the body and the bath so as to effect surface modification of the ribbon.

In a preferred embodiment of the invention the electrically conductive body is a body of molten copper-lead alloy which is maintained against the upper surface of the advancing ribbon of glass by causing the alloy to cling to a copper bar mounted adjacent the glass surface and transversely of the direction of advance of the ribbon of glass, a regulated electric current is passed between the copper bar and the bath, and the ancillary body is of molten copper-lead alloy which clings to a second copper bar spaced from the first-mentioned bar, whereby any condensed lead on the treated glass surface is taken up in the second alloy body.

Lead is the more volatile of the constituents of the copper-lead alloy and with the current conditions at the temperature of the electrical treatment of the ribbon surface to produce a desired change in characteristics, e.g. at 750° C there may result some vapour of and then some condensation of lead onto the glass surface. By wiping the ribbon surface with a second electric current-free body of copper-lead alloy after the glass has been further advanced for a distance of about 15 ft., any condensed lead on the ribbon surface will be absorbed into the second body of alloy. At the location of the second body, the wiping generally occurs at a lower temperature since the glass is cooled to about 650° C.

The invention also comprehends a glass body, e.g. flat glass having predetermined surface characteristics produced by a method as hereinbefore described.

BRIEF DESCRIPTION OF THE DRAWINGS

FIG. 1 is a sectional elevation of apparatus for carrying out the invention including a tank structure containing a bath of molten metal, a roof structure over the tank structure, means for pouring molten glass onto the bath and two electrodes mounted above the bath to each of which a body of molten electrically conductive material clings and, FIG. 2 is plan view of the apparatus of FIG. 1 but with the roof structure removed.

DESCRIPTION OF THE PREFERRED EMBODIMENTS

Referring to the drawings a forehearth of a continuous glass melting furnace is indicated at 1 and a regulating tweel at 2. The forehearth ends in a spout 3 comprising a lip 4 and side jambs 5 one of which is shown in FIG. 1. The lip 4 and side jambs 5 together constitute a spout of generally rectangular cross-section. The spout 3 is disposed above the floor 6 of an elongated tank structure including side walls 7, a floor 6, an end wall 8 at the inlet end of the tank and an end wall 9 at the outlet end of the tank all joined together to form a tank structure. The tank structure holds a bath of molten metal 10 whose surface level is indicated at 11. Preferably the bath is a bath of molten tin or a molten alloy of tin in which tin predominates and which has a specific gravity greater than that of the glass.

A roof structure is supported over the tank structure and the roof structure includes a roof 12, side walls 13 and end walls 14 and 15 respectively at the inlet and outlet ends of the bath. The inlet and wall 14 extends downwardly close to the surface 11 of the bath of molten metal to define with that surface an inlet 16 which is restricted in height and through which the molten glass is advanced, as will be hereinafter described.

The outlet end wall 15 of the roof structure defines with the outlet end wall 9 of the tank structure a restricted outlet 17 through which the ultimate ribbon of glass produced on the bath is discharged on to driven conveyor rollers 18 mounted outside the outlet end of that tank structure and disposed somewhat above the level of the top of the end wall 9 of the tank structure so that the ribbon is lifted clear of the wall 9 for discharge through the outlet 17.

The rollers 18 convey the ultimate ribbon of glass to an annealing lehr in well known manner and also apply tractive effort to the ribbon of glass to assist in advancing the ribbon as it glides along the surface of the bath 10.

An extension 19 of the roof structure extends up to the tweel 2 and forms a chamber having side walls 20 in which the spout 3 is disposed.

Molten soda-lime-silica glass 21 is poured onto the bath 10 of molten metal from the spout 3 and the tweel 2 regulates the rate of flow of the molten glass 21 over the spout lip 4. This lip is vertically spaced from the surface 11 of the bath so that there is a free fall of the molten glass 21 through a distance of a few inches (which distance is exaggerated in FIG. 1 for sake of clarity) to the level of the bath surface 11. This free fall is such as to ensure the formation of a heel 22 of molten glass behind the glass pouring over the spout, which heel extends back to the inlet end wall 8 of the tank structure.

The temperature of the glass as it is advanced along the bath is regulated from the inlet end down to the discharge end by temperature regulators 23 immersed in the bath 10 and temperature regulator 24 mounted in the headspace 25 defined by the roof structure over the bath. A protective gas is supplied to the headspace through ducts 26 which are connected by branches 27 to a header 28 which is connected to a supply of protective gas. The protective gas may be an inert gas, for example nitrogen, or may contain a reducing constituent, for example a small percentage of hydrogen. A plenum of the protective gas is maintained in the substantially closed headspace over the bath and there is outward flow of protective gas through the restricted inlet 16 and the restricted outlet 17 from the headspace.

Molten glass is delivered to the bath at a temperature of about 1,000° C. and its temperature is regulated by the regulators 23 and 24 as the glass is advanced along the bath so as to ensure that a layer of molten glass 29 is established on the bath. This layer is advanced through the inlet 16 and during this advance there is unhindered lateral flow of the molten glass under the influence of surface tension and gravity to the limit of free flow of the glass until there is developed on the bath surface from the layer 29 a buoyant body 30 of molten glass which is then advanced in ribbon form along the bath. The width of the tank structure at the surface level of the bath is greater than the width of the buoyant body 30 of molten glass so that there is no limitation to the initial unhindered lateral flow of the molten glass.

The advancing glass body in ribbon form is gradually cooled during its further advance along the bath and in order to impart a desired surface characteristic to the upper face of the ribbon of glass, a molten material is maintained against the upper surface of the glass as it is advanced under thermal conditions causing modification of the glass surface by the molten material.

As shown in FIGS. 1 and 2 a bar 31, which is made of copper, is mounted just above the upper surface of the glass in a region of the tank structure where the temperature of the advancing glass has been cooled to a temperature in the range of about 700° to 800° C. A gap, for example, of about 3 to 4 mm. is maintained between the bottom of the bar 31 and the path of travel of the upper surface of the ribbon of glass 30 and the bar 31 is maintained in this position by a supporting beam 32 which extends across the headspace over the bath between the side walls of the tank structure. The supporting beam 32 is electrically insulated from the tank structure and the bar 31 is suspended from the beam 32 by struts 32a. Electrical connection is made to the bar 31 through the beam 32 and the struts 32a. Additional means (not shown) may be provided for assisting in locating the bar 31 accurately adjacent the upper surface of the glass, and in the preferred embodiment, where the copper bar 31 is to be used as an anode these additional means are constituted by electrical insulating means (not shown).

The bar 31 acts as a locating member for a body 33 of a molten alloy of copper and lead, e.g. 98 percent lead and 2 percent copper, which clings to the bar. The molten body 33 is confined between that surface and the upper face of the glass, so that the molten alloy is in continuous intimate contact with the upper face of the glass. The clinging of the body 33 of molten alloy to the bar ensures the location of that body relative to the glass and prevents forward movement of the molten alloy with the glass. An electric current is passed through the glass from the alloy body 33 into the molten metal bath so that migration is assisted by electrolytic action. At the treatment temperature wherein the glass is susceptible of surface modification, the current conditions employed to electrolytically assist migration generate vapours from the body 33.

A second electrode 34 dips into the bath of molten metal alongside the path of travel of the glass and near one end of the bar 31 and this electrode 34 also extends through the side wall of the tank structure for connection to the other terminal of a controllable electrical supply circuit which is also connected to the bar 31. The electrical connection is such that the bar 31 effectively acts as an anode of the electrolytic system comprising the bar 31, the body of molten material 33, the glass 30 and the bath of molten metal 10. The passage of current from the body 33 of molten alloy through the glass and into the molten metal bath ensures controlled migration at the interface between the alloy and the glass of modifying ions from the body 33 into the top surface of the glass thereby effecting a predetermined change in the surface characteristics of the glass.

The electric current passing through the glass between the bar 31 and the bath of molten metal is regulated in relation to the speed of advance of the ribbon of glass so that the migration and entry of an element into the top surface of the ribbon of glass is accurately controlled thereby controlling the intensity of the change in characteristic of the surface of the glass. When employing a copper-lead alloy and a protective atmosphere with a reducing constituent as in the method described by way of example, there results a glass with enhanced reflectivity and a grey-bronze tint. This gives an efficacious solar heat rejection glass, the glass having a desired grey-bronze tint of 50 percent transmission.

In the preferred embodiment the bar 31 is 2.5 metres long and 5 cm wide and the ribbon of glass at a temperature in the region of 750° to 780° C is moving below the bar 31 at a speed of about 5 metres per minute while 95 amps. of current are passed between the alloy body 33 through the ribbon of glass to the bath of molten metal.

The use of lead in the body 33 of molten alloy of 98 percent lead and 2 percent copper at a temperature of about 750° C engenders some fuming of vapour off the body 33 to the headspace over the bath and it has been found that lead products may condense onto the upper surface of the already treated ribbon of glass as it is further advanced along the bath towards the outlet end of the bath. In order to remove any such condensed products an ancillary body of molten copper-lead alloy 36 is maintained in wiping contact with the treated glass surface at a distance downstream from the body 33 in the direction of advance of the ribbon. A second bar 37, for example of refractory material or copper, mounted on a connection rod 38 by struts 38a, is supported above the glass surface at the same distance as the bar 31, that is about 3 to 4 mm, at a distance of from 2.5 m to 5 m downstream of the bar 31, where the temperature of the glass is in the region 700° C. At this temperature the molten alloy consists of 99 percent lead and 1 percent copper. The glass is normally discharged from the molten metal bath at a temperature of about 650° C and the separation between the bars 31 and 37 is such that the ancillary body 36 is at the lower, e.g. 650° C temperature, dependent on the temperature gradient in the region of the outlet end of the tank structure. The spacing is such that the ancillary body 36 is sufficiently far downstream of the body 33 to wipe up all condensed vapour resulting from fuming from the body 33.

The clinging of the ancillary body 36 to the bar 37 ensures the location of that body relative to the glass and prevents forward movement of the molten body with the glass. As will be apparent the ancillary body 36 is maintained electric current-free so as to avoid its becoming vapourised by electric heating, and there is intimate contact of the treated upper surface of the ribbon by the molten body 36 so that any condensed products, for example lead products, existing on the treated glass surface, and minute particles of the alloy of the body 33 which may inadvertantly be carried forward by the treated glass surface, are absorbed into the ancillary body 36 or even dissolved into that body as the treated glass surface is wiped in passing under the body 36 which thus has also the function of cleaning the upper surface of the treated ribbon of glass before its discharge from the molten metal bath.

It has been found that by passing 95 amps. from the first body 33 into the glass when the ribbon is moving at 5 metres per minute, a grey-bronze tint at 50 percent transmission is obtained. At the location at which the ancillary bar 37 and the electric current-free body 36 clinging to it exists, no problem has been experienced due to fuming from the body 36 of molten alloy, and the wiping action minimizes the problems associated with fuming at the body 33.

It has additionally been found that the wiping of the treated glass surface, for example treated with copper, with an ancillary body of molten metal helps to preserve the colouration of the glass surface during subsequent exposure of the treated glass to atmospheric oxygen for example during annealing and toughening.

In another embodiment of the invention hot, flat glass may be supported and advanced on a roller conveyor while the two bodies of molten material are maintained against the upper surface of the glass. A further body of molten electrically conductive material clinging to the upper surface of a locating bar may be positioned between two of the rollers of the conveyor so that the molten body makes electrical contact with the undersurface of the glass opposite the first body 31. Electric current can then be passed between the opposing upper and lower bodies through the glass to effect the desired surface modification of the glass.

The undersurface of the glass may be treated to impart predetermined characteristics to that surface, by means of a first body of molten material which is located between rollers of the conveyor, and is associated with an ancillary electric current-free wiping body of molten material also located between rollers of the conveyor. When electrical treatment of the undersurface of the glass is to be effected the upper surface of the glass is also contacted by a body of molten electrically conductive material opposite the first body so that electric current can be passed from the first body into the undersurface of the glass Further, the hot glass body may be stationary while it is treated and the body of molten material which modifies the surface, as well as the ancillary body wiping the treated surface, may be mounted in a chamber, which is movable relative to the glass so that the molten bodies are brought into contact with the glass surface. Displacement of the chamber with the molten bodies relative to the glass, for example by rotation, then takes place during the treatment of the glass surface.

The use of an ancillary wiper body of molten material is also efficacious between two dissimilar molten metal bodies contacting the glass surface in order to cleanse the treated surface before it passes beneath the second molten body.

From the foregoing, it will be appreciated that the float glass may be surface modified through the agency of controlled electric current and a body of molten electrically conductive material, basically according to the principles set forth in U.S. Loukes et al. Pat. No. 3,467,508 (the disclosure of which is hereby incorporated by reference). According to the present invention, any fuming problems that may occur by reason of the current and temperature conditions employed to cause ionic migration may be essentially eliminated by the downstream location of the electric current-free ancillary wiping body. The ancillary body 36 provides cleansing action on the modified glass surface and the upstream body 33 provides a source of modifying material. Thus the invention not only provides an improvement in the treatment of glass to provide predetermined surface characteristics by providing a cleansing stage for the treated surface of the glass, but also permits a fine control to be achieved of the tint of the treated glass independently of the transmission characteristics achieved in the initial surface treatment.

What is claimed is:

1. In a method of producing float glass having a predetermined surface characteristic, comprising continuously forming and advancing a ribbon of glass along a bath of molten metal, maintaining the advancing ribbon sufficiently hot to be susceptible to surface modification utilizing a molten metal body, maintaining a current conducting first molten metal body against the upper surface of the ribbon, passing a controlled electric current through the glass between the first molten body and the bath to effect surface modification of the ribbon, and continuing the advance of the surface-modified ribbon along the bath, and wherein a vapour originating from the current conducting first molten metal body is engendered, the improvement comprising: maintaining against the modified surface of the advancing ribbon downstream of said first body an ancillary molten metal body, electrically isolating said ancillary molten metal body to maintain that body electric current-free, maintaining the electric current-free ancillary body at a lower temperature than the first body, spacing the ancillary body downstream of said first body by a distance which locates the ancillary body beyond the region of condensation of vapour originating from the first body, and, without passing current through said ancillary body to effect surface modification of the ribbon, cleansing the modified glass surface of any metal of said first body which is present on the modified surface of the ribbon by absorbing that metal with said electric current free ancillary molten metal body while not engendering vapour therefrom.

2. A method according to claim 1, wherein the temperature of said first body is in the range 700° to 800° C, and the temperature of the glass in the region where the ancillary body is located is in the range 650° to 700° C.

3. A method according to claim 2, wherein the temperature of said first body is in the range 750° to 780° C.

4. A method according to claim 1, wherein said first body is a body of molten copper-lead alloy which is maintained against the upper surface of the advancing ribbon of glass by causing the alloy to cling to a copper bar mounted adjacent the glass surface and transversely of the direction of advance of the ribbon of glass, and the ancillary body is of molten copper-lead alloy which clings to a second copper bar spaced from the first-mentioned bar, whereby any condensed lead on the treated glass surface is taken up in the second alloy body.

* * * * *

UNITED STATES PATENT OFFICE
CERTIFICATE OF CORRECTION

Patent No. 3,798,016　　　　　　　　　Dated　March 19, 1974

Inventor(s)　Edward Russell Ormesher et al

It is certified that error appears in the above-identified patent and that said Letters Patent are hereby corrected as shown below:

On title page, --Priority claimed from British Application No. 14737/68 filed March 27, 1968 --.

Signed and sealed this 17th day of September 1974.

(SEAL)
Attest:

McCOY M. GIBSON JR.　　　　　　　　C. MARSHALL DANN
Attesting Officer　　　　　　　　　　Commissioner of Patents